(12) United States Patent
Grethel

(10) Patent No.: US 12,140,191 B2
(45) Date of Patent: Nov. 12, 2024

(54) METHOD FOR ACTUATING A DECOUPLING UNIT

(71) Applicant: Schaeffler Technologies AG & Co. KG, Herzogenaurach (DE)

(72) Inventor: Marco Grethel, Bühlertal (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/270,340

(22) PCT Filed: Nov. 30, 2021

(86) PCT No.: PCT/DE2021/100952
§ 371 (c)(1),
(2) Date: Jun. 29, 2023

(87) PCT Pub. No.: WO2022/148508
PCT Pub. Date: Jul. 14, 2022

(65) Prior Publication Data
US 2024/0052895 A1 Feb. 15, 2024

(30) Foreign Application Priority Data
Jan. 11, 2021 (DE) .................. 10 2021 100 272.9

(51) Int. Cl.
*F16D 48/02* (2006.01)
(52) U.S. Cl.
CPC ...... *F16D 48/02* (2013.01); *F16D 2048/0209* (2013.01); *F16D 2048/0263* (2013.01)

(58) Field of Classification Search
CPC ................ F16D 48/02; F16D 48/0206; F16D 2048/0257; F16D 2048/0266; F16D 2048/0263
See application file for complete search history.

(56) References Cited

U.S. PATENT DOCUMENTS

| | | | |
|---|---|---|---|
| 2007/0080040 A1* | 4/2007 | Bader | F16D 25/088 |
| | | | 192/85.51 |
| 2018/0283475 A1* | 10/2018 | Grethel | F16D 48/0206 |
| 2020/0182314 A1* | 6/2020 | Wei | F16D 48/066 |

FOREIGN PATENT DOCUMENTS

| | | | |
|---|---|---|---|
| DE | 102010043257 A1 | 5/2012 | |
| DE | 102015122574 A1 * | 6/2017 | ......... F16D 48/0206 |
| DE | 102016219153 A1 | 4/2018 | |
| DE | 102018106854 A1 * | 9/2019 | |
| DE | 102018120446 A1 | 2/2020 | |
| DE | 102019122920 A1 | 2/2020 | |
| DE | 102021100271 A1 | 7/2022 | |
| EP | 2545305 A1 | 1/2013 | |
| JP | S60151421 A | 8/1985 | |
| WO | WO2014133434 A1 | 9/2014 | |
| WO | 2014161751 A1 | 10/2014 | |

(Continued)

*Primary Examiner* — Stacey A Fluhart

(57) ABSTRACT

The disclosure relates to a method for actuating a decoupling unit in a powertrain which comprises at least one driven axle. The aim of the disclosure is to simplify the actuation of the decoupling unit. This is achieved in that the decoupling unit is passively actuated in an actuation direction using an actuation force, which is provided in a hydraulic system, via a first hydraulic functional surface, and the decoupling unit is passively actuated in a restoring direction using a restoring force via a second hydraulic functional surface.

18 Claims, 2 Drawing Sheets

(56) References Cited

FOREIGN PATENT DOCUMENTS

WO 2015114125 A2 8/2015
WO 2017194047 A1 11/2017

* cited by examiner

METHOD FOR ACTUATING A DECOUPLING UNIT

CROSS-REFERENCE TO RELATED APPLICATIONS

This application is the U.S. National Phase of PCT Application No. PCT/DE2021/100952 filed on Nov. 30, 2021, which claims priority to DE 10 2021 100 272.9 filed on Jan. 11, 2021, the entire disclosures of which are incorporated by reference herein.

TECHNICAL FIELD

The disclosure relates to a method for actuating a decoupling unit in a drive train that includes at least one driven axle.

BACKGROUND

The drive train can be a motor vehicle drive train with an e-axle, in particular a 2-speed e-axle. A motor vehicle drive train with a 2-speed e-axle containing only one planetary carrier is known from the German published patent application DE 10 2018 120 446 A1. A method for controlling a cut-out clutch in a hybrid drive train is known from the international published patent application WO 2017/194047 A1. A hybrid module with a cut-out clutch and actuating device is known from the German published patent application DE 10 2019 122 920 A1.

SUMMARY

The object of the disclosure is to simplify the actuation of a decoupling unit in a drive train that includes at least one driven axle.

The object is achieved with a method for actuating a decoupling unit in a drive train which comprises at least one driven axle in that the decoupling unit is passively actuated using an actuation force, which is provided in a hydraulic system, in an actuating direction via a first hydraulic functional surface, wherein the decoupling unit is passively actuated in a restoring direction via a second hydraulic functional surface with a restoring force. Inactive drives generate drive losses or friction losses if they are not decoupled from the drive train. If a drive train includes two driven axles, unwanted losses can advantageously be avoided by decoupling a driven axle that is not required in normal drive operation. Conventional transmissions have clutches that can be used to decouple a driven wheel or driven axle. Vehicles with e-axles often have no switchable transmission or only a 2-speed transmission, as is known, for example, from the German published patent application DE 10 2018 120 446 A1 acknowledged at the outset. Unwanted losses can be reduced by appropriate decoupling units. To decouple a driven axle that is not required, an actuator is normally required, which comprises an active element with an electric motor or at least with an electrically or electromagnetically controlled valve. In the described method, active elements that are already present and that are used, for example, to change a transmission ratio, are advantageously used to hydraulically passively actuate the decoupling unit. This provides the advantage that the decoupling takes place without additional active elements. Here, for example, use is made of the fact that two existing transmission elements, such as clutches or brakes, do not transmit any torque when not actuated, so that the decoupling unit can be actuated with the hydraulic supply and the already existing active elements of the transmission elements. The decoupling unit is, for example, a cut-out clutch that is normally open. To close the normally open cut-out clutch, hydraulic signals that are present in the hydraulic system are advantageously used and logically connected. To open the decoupling unit, particularly the cut-out clutch, a hydraulic signal that can be used for this purpose is generated and logically connected in the hydraulic system. Among other things, this provides the advantage of being able to dispense with an actuator that would otherwise be required for actuating or restoring the decoupling unit. As a result, the manufacturing costs and/or operating costs of actuating the decoupling unit in the drive train can be effectively reduced.

An exemplary embodiment of the method is characterized in that the decoupling unit is passively actuated with an actuation force from one of two transmission elements. The transmission elements are two transmission elements already present in the drive train, such as clutches or brakes. This exploits the fact that the actuation force is not always required to actuate the transmission elements. This actuation force is then advantageously used to hydraulically passively actuate the decoupling unit. In this way, energy can be effectively saved in the operation of the drive train. The decoupling unit can be controlled passively with the actuation force or via an OR valve.

Another exemplary embodiment of the method is characterized in that the transmission elements and the decoupling unit are designed in such a way that a touch point is reached when the decoupling unit is actuated before a touch point of the transmission elements. A ventilation path of one of the transmission elements can thus advantageously be used in order to actuate the decoupling unit hydraulically. This provides the advantage that the function of the existing transmission elements is not impaired.

A further exemplary embodiment of the method is characterized in that the decoupling unit is actuated via an OR valve which is hydraulically connected to actuating branches of the transmission elements. In this way, the hydraulically passive actuation of the decoupling unit can be implemented with little outlay in terms of design and production technology.

A further exemplary embodiment of the method is characterized in that the decoupling unit is actuated via a pressure-reducing valve which is actuated via an OR valve which is hydraulically connected to actuating branches of the transmission elements. In this way, a functional hydraulically passive actuation of the decoupling unit can be ensured even when the pressure present in the hydraulic system for actuating the decoupling unit is rather low. The pressure reducing valve can be hydraulically supplied via a hydraulic pressure source, by means of which the transmission elements are also supplied. However, the pressure-reducing valve can also be hydraulically supplied via another hydraulic pressure source that is present in the hydraulic system.

A further exemplary embodiment of the method is characterized in that the transmission elements are normally open clutches or brakes which are closed hydraulically via the respective associated actuating branch after the decoupling unit designed as a normally open cut-out clutch has been closed by means of the same actuating branch. In this way, the decoupling unit can be hydraulically passively actuated with little expenditure in terms of design and manufacturing, without impairment of the ease of actuation of the clutches or brakes.

A further exemplary embodiment of the method is characterized in that the decoupling unit is passively actuated with a back pressure which prevails in the hydraulic system in the presence of a hydraulic resistance. Here, the fact that the drive train does not require cooling and/or lubrication in a non-moving state can, for example, be exploited. The back pressure that is already present and is not required can then be used for hydraulically passive actuation of the decoupling unit.

A further exemplary embodiment of the method is characterized in that the back pressure of a cooling and/or lubrication system is used to close the decoupling unit, which is designed as a normally open cut-out clutch, before an axle drive of the driven axle is activated. This ensures in a simple manner that sufficient cooling and/or lubrication is provided when the driven axle is activated.

A further exemplary embodiment of the method is characterized in that when a motor vehicle equipped with the drive train is coasting, at least one driven axle is decoupled by means of the passively actuated decoupling unit. In this way, a highly efficient coasting operation of the drive train can be implemented with little expenditure in terms of design and manufacturing.

A further exemplary embodiment of the method is characterized in that one of two driven axles is decoupled by means of the passively actuated decoupling unit in order to reduce losses, while the other of the two driven axles drives a motor vehicle equipped with the drive train. In this way, undesirable losses in the operation of the drive train can be effectively reduced with simple means.

A further exemplary embodiment of the method is characterized in that the restoring force in tank lines is generated by two transmission elements. The transmission elements can be two transmission elements already present in the drive train, such as clutches or brakes. After actuation, the transmission elements are discharged into the tank via tank lines. The pressure prevailing in the tank lines is advantageously increased somewhat in order to generate the restoring force. Connections of check valves and orifices in clutch pressure lines are conceivable in order to generate pressure signals for restoring the decoupling unit depending on the direction of flow. The decoupling unit is actuated, in particular engaged, as described below with reference to various exemplary embodiments, by means of the first hydraulic functional surface, which is advantageously formed on a double-acting piston. The first hydraulic functional surface is circular, for example. The restoring or disengagement of the decoupling unit is initiated by means of the second hydraulic functional surface, which is designed, for example, in the shape of a ring. The double-acting piston can be moved back and forth in a cylinder which is also known as a double-acting cylinder.

A further exemplary embodiment of the method is characterized in that a hydraulic resistance is arranged in each case in the tank lines of the transmission elements in order to generate the restoring force. The hydraulic resistance is, for example, an orifice. A desired restoring force can be set using the size of the hydraulic resistance. An appropriate restoring force signal is advantageously tapped off between the hydraulic resistance and a pressure reducing valve which is assigned to the respective transmission element, wherein the pressure reducing valve is also being referred to as a clutch valve if the transmission element is a clutch.

A further exemplary embodiment of the method is characterized in that the restoring force is tapped via an OR valve. The tank lines are connected to two connections of the OR valve, so that the OR valve is acted upon by the respective increased tank pressure, which represents the restoring force. The restoring force acts upon the second hydraulic functional surface via a third connection of the check valve. In this way, the decoupling unit is advantageously restored passively.

A further exemplary embodiment of the method is characterized in that actuation of the decoupling unit is carried out with an amplified signal. This provides the advantage that the decoupling unit can be reliably actuated, in particular engaged, with relatively little actuation force.

A further exemplary embodiment of the method is characterized in that the decoupling unit is restored with an amplified signal. This provides the advantage that the decoupling unit can be disengaged or restored safely with a relatively low restoring force. The low restoring force provides the advantage that dynamic actuation or engagement of the decoupling unit is only slightly influenced by the restoring force.

A further exemplary embodiment of the method is characterized in that a hydraulic control surface for restoring the decoupling unit is larger than a control surface for actuating the decoupling unit. A pressure level for switching the OR valve is typically lower than the touch pressures of the transmission elements designed as clutches. This is important when torque is transferred from a first clutch to a second clutch, since in this case the decoupling unit should remain securely closed. With such a design, the decoupling can take place only when one of the two clutches is already open and the second clutch passes through its touch point when opening.

A further exemplary embodiment of the method is characterized in that the decoupling unit comprises a double-acting hydraulic cylinder, which is actuated and reset via a decoupling valve. The decoupling valve is designed as a 4/2-way valve, for example. Advantageously, two hydraulic pressure chambers of the double-acting hydraulic cylinder are connected to one side of the decoupling valve. An actuating force line and a tank line are advantageously connected to the other side of the decoupling valve. The decoupling valve is advantageously controlled with two different pressures.

Another exemplary embodiment of the method is characterized in that the decoupling valve is designed as a 4/2-way valve that is controlled via two OR valves. One of the OR valves is connected between the previously described tank lines of the transmission elements. The other OR valve is advantageously connected between two actuation branches of the transmission elements. In this way, the decoupling unit can be passively controlled in a highly effective manner both when it is actuated and when it is restored.

A further exemplary embodiment of the method is characterized in that the decoupling valve is designed as a proportional valve. The reversal from a first to a second end position of the decoupling valve is proportional to the respective pressure signal size. The respective load pressures are advantageously fed back to the decoupling valve. A transitional position can be designed between the two end positions in such a way that the two pressure chambers of the double-acting cylinder are located on the tank. This has the advantage that there can never be pressure on both pressure chambers of the double-acting hydraulic cylinder at the same time.

The disclosure may further relate to a computer program product with a program code for carrying out the method described above when the computer program product is arranged on a processing device or is stored on a computerreadable data carrier. The computer program product is used, for example, in a control system of the hydraulic system or the drive train with the hydraulic system.

The disclosure may also relate to a hydraulic system for a drive train described above.

The disclosure may also relate to a decoupling unit, an OR valve and/or a decoupling valve for such a hydraulic system. The parts mentioned can be marketed separately.

BRIEF DESCRIPTION OF THE DRAWINGS

Further advantages, features and details of the disclosure are apparent from the following description, in which various exemplary embodiments are described in detail with reference to the drawing. In the figures.

DETAILED DESCRIPTION

Figure 1:
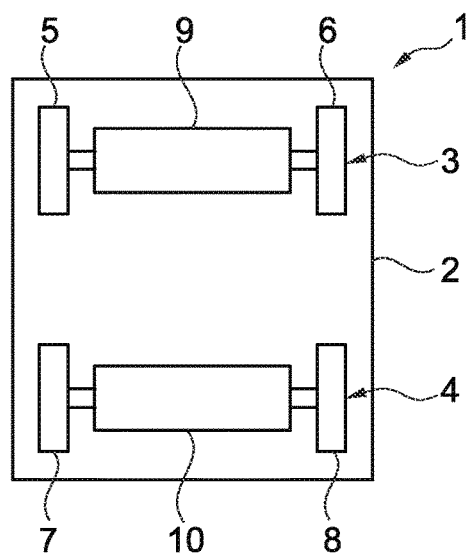
FIG. 1 shows a schematic representation of a motor vehicle with two driven axles.

In FIG. 1, a motor vehicle 1 with a drive train 2 is shown schematically. The drive train 2 comprises two driven axles 3, 4. The driven axles 3, 4 are each equipped with two wheels 5, 6 and 7, 8.

An axle drive 9 is assigned to the driven axle 3. An axle drive 10 is assigned to the driven axle 4. When the motor vehicle 1 is in operation, both axle drives 9, 10 do not always have to be active at the same time. In order to avoid losses, one of the axle drives 9, 10 can be switched off during normal driving.

Figure 2:
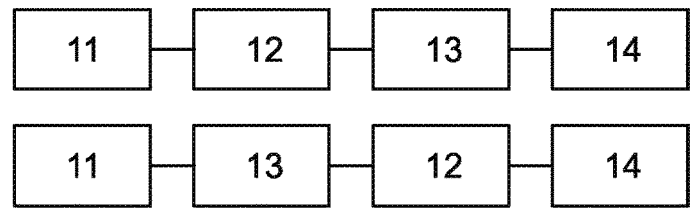
FIG. 2 shows two exemplary embodiments of a functional chain in a drive in different positions of a decoupling unit.

In FIG. 2, two options for a functional chain with a drive 11, a transmission ratio device 12, a decoupling unit 13 and a wheel 14 are shown schematically. The transmission ratio device 12 is, for example, a transmission. In order to avoid unwanted losses during operation of the drive 11, the drive 11 can be decoupled with the decoupling unit 13. As a result, losses to the wheel 14 can be reduced.

Vehicles with classical drives have transmissions with clutches and gears. Losses to the wheel can usually be adequately decoupled here using the clutches and the selection of the gears.

In vehicles with so-called e-axles, shiftable transmissions are often not installed. Here, the decoupling unit 13 can be used advantageously in order to reduce losses during operation when the respective drive 11 is not required.

Vehicles with e-axles can also have multiple gears, in particular double gears. Here, too, the decoupling unit 13 can be used advantageously in order to minimize losses. The upper functional chain of FIG. 2 provides for the decoupling unit 13 to be arranged closer to the wheel 14.

An appropriate actuator can be used to actuate the decoupling unit 13. Conventional actuators include at least one active element with an electric motor or at least with an electric valve.

Figure 3:
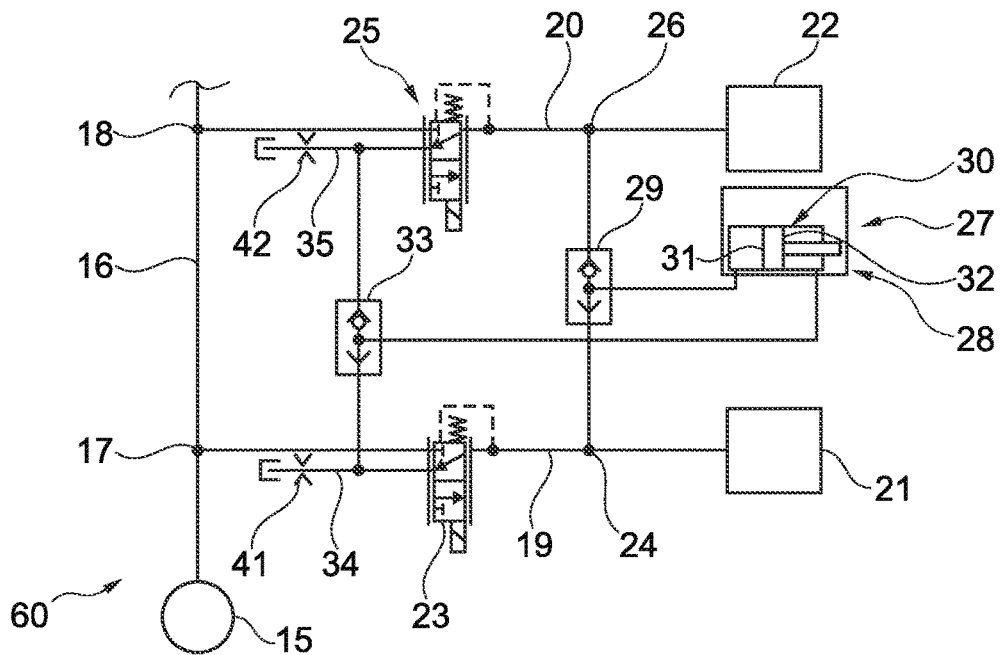
FIG. 3 shows a hydraulic system for actuating and restoring a decoupling unit in a drive train of a motor vehicle according to a first exemplary embodiment.
Figure 4:
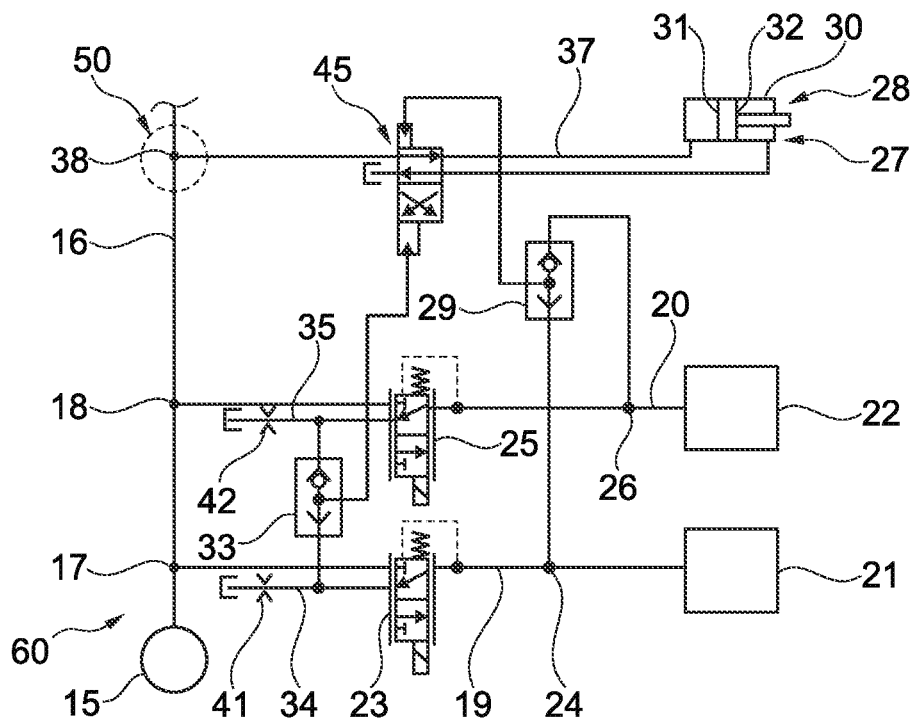
FIG. 4 shows an exemplary embodiment similar to that in FIG. 3 with an additional decoupling valve which is assigned to the decoupling unit.
Figure 5:
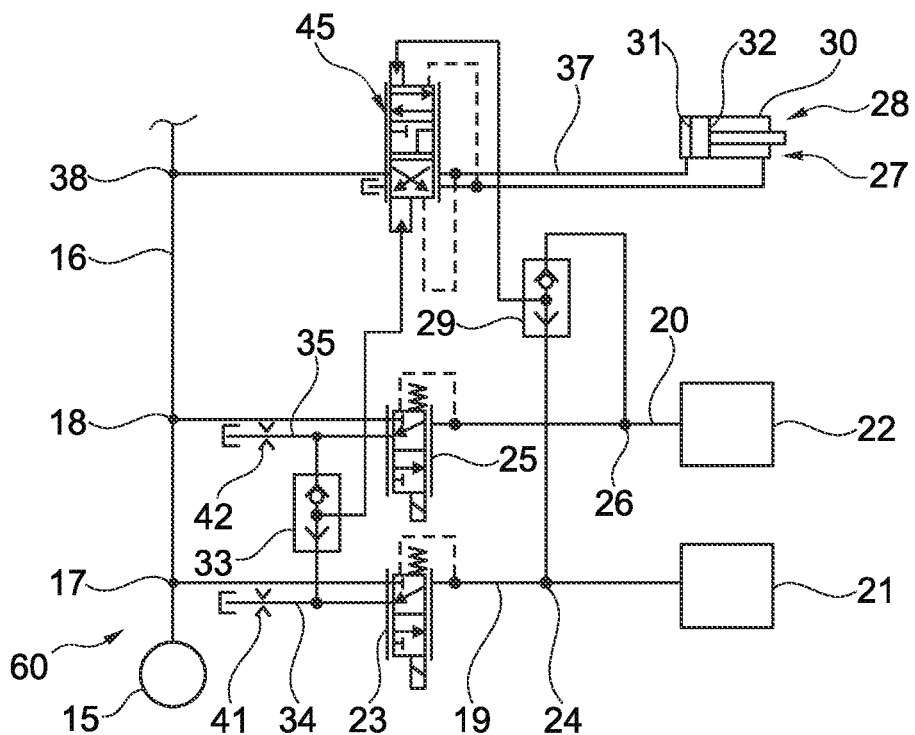
FIG. 5 shows an exemplary embodiment similar to that in FIG. 4, wherein the decoupling valve is designed as a proportional valve with a reversing system.

FIGS. 3 to 5 show how the desired decoupling function can be implemented with a hydraulic system 60 without an additional active element being required for the decoupling unit. In the exemplary embodiments of the hydraulic system 60 in FIGS. 3 to 5, a decoupling unit 27 is connected to existing active elements in such a way that the decoupling unit 27 can be actuated effectively without additional active elements. The same reference signs are used in FIGS. 3 to 5 to designate the same or similar parts. Common features are described only once. The hydraulic system 60 includes a hydraulic pressure source 15. The hydraulic pressure source 15 includes, for example, at least one hydraulic pump.

In the FIGS. 3 to 5, an actuation force line 16 is connected to the outlet of the hydraulic pressure source 15. A hydraulic consumer, such as a parking lock, can be connected to an upper end of the actuation force line 16, which is cut off in FIGS. 3 to 5. In the actuation force line 16, two branching points 17, 18 are provided.

A first actuating branch 19 is connected to branching point 17. A second actuating branch 20 is connected to branching point 18. A first transmission element 21 is assigned to the first actuating branch 19. A second transmission element 22 is assigned to the second actuation branch 20. A pressure reducing valve 23, 25 is arranged in each of the actuating branches 19, 20.

A hydraulic branch 24, 26 is additionally provided between the pressure reducing valve 23, 25 and the transmission element 21, 22. An OR valve 29 is connected between branching points 24 and 26.

FIG. 3 shows the simplest variant of the hydraulic system 60. The decoupling unit 27 is connected directly to the OR valve 29, which in turn is connected between the branching points 24 and 26. The decoupling unit 27 is, for example, a cut-out clutch. The transmission elements 21 and 22 are, for example, clutches or brakes.

The transmission elements 21 and 22 are actuated via the pressure reducing valves 23, 25. In the non-actuated state, the transmission elements 21, 22, in particular the clutches 21, 22, do not transmit any torque. This means that the decoupling unit 27 can also be open when the clutches 21, 22 are open.

During operation of the hydraulic system 60, it must be ensured that the decoupling unit 27 designed as a cut-out clutch 28 is securely closed before one of the transmission elements, in particular one of the clutches 21, 22, transmits torque.

Therefore, the cut-out clutch 28 is to be designed in such a way that the cut-out clutch 28 is securely closed at a low pressure before one of the clutches 21, 22 begins to transmit torque. In order to achieve this, the pressure range of a so-called ventilation path of one of the clutches 21, 22 is used to close the cut-out clutch 28. An actuation path up to a touch point is designated the ventilation path. When the touch point is exceeded, torque is transmitted in a targeted manner.

A symbol 30 in FIG. 3 indicates that the decoupling unit 27 designed as a cut-out clutch 28 comprises a double-acting cylinder. In the double-acting cylinder 30, a piston in FIG. 3 is guided back and forth to the left and to the right. The piston comprises a first hydraulic functional surface 31 on the left in FIG. 3 and a second hydraulic functional surface 32 on the right in FIG. 3. The first hydraulic functional surface 31 is designed as a circular surface. The second hydraulic functional surface 32 is designed as an annular surface.

The first hydraulic functional surface 31 is acted upon by an actuation force from the first actuating branch 19 or from the second actuating branch 20 via the OR valve 29. The second hydraulic functional surface 32 can be acted upon by a restoring force from a tank line 34 or from a tank line 35 via an OR valve 33.

The tank line 34 is connected to the pressure reducing valve 23. The tank line 35 is connected to the pressure reducing valve 25. A hydraulic resistance 41 is arranged in the tank line 34. A hydraulic resistance 42 is arranged in the tank line 35.

The decoupling unit 27 is engaged via the first, circular hydraulic functional surface 31 and the OR connection of the actuating branches 19 and 20. The disengagement is initiated via the second annular hydraulic functional surface 32. The working pressure, referred to as the restoring force, is tapped off via the OR connection of the tank lines 34, 35.

In contrast to the engagement process, the working pressure must first be generated during the disengagement process. As shown in FIG. 3, this can be done by the hydraulic resistances 41, 42 in the tank lines 34, 35. The hydraulic resistances 41, 42 are designed, for example, as orifices. The pressure signal for the disengagement process is tapped off between the pressure reducing valve 23, 25 and the hydraulic resistance 41, 42 and fed to the OR valve 33.

The working pressures, signal pressures or restoring forces for disengagement should be relatively low in order to only slightly influence the dynamic opening of the transmission elements 21, 22 designed as clutches. Reliable disengagement of the decoupling unit 27 is therefore only possible with a very large hydraulic functional surface 32.

It is therefore proposed with the exemplary embodiment in FIG. 4 that both engagement and disengagement take place with signal amplification. Ideally, this takes place with a passive decoupling valve 45, which is arranged in an actuating branch 37. The actuating branch 37 is connected to a branch 38 of the actuation force line 16. In this way, the decoupling valve 45 is supplied from the actuation force line 16 with an actuation force or system pressure which is provided at the outlet of the hydraulic pressure source 15.

A dashed circle in FIG. 4 indicates a further hydraulic pressure source 50, which can be provided in the hydraulic system 60 to supply the actuating branch 37 with the actuation force or system pressure. In this case, the hydraulic connection between branching points 18 and 38 is omitted in FIG. 4. In contrast to what is shown in FIG. 4, the signal-amplified engagement and disengagement can also take place with one passive valve for engagement and disengagement, respectively.

The engaged operating situation is shown in FIG. 4, in which the system pressure is connected to the first hydraulic functional surface for engagement. The decoupling unit 27 is engaged from a pressure threshold that must be reached once. This is done by varying the system pressure before the transmission elements 21 or 22 are activated or torque is transmitted with the transmission elements 21, 22 designed as clutches.

Opening of the decoupling unit 27 designed as a cut-out clutch 28 takes place in the reverse order. If the transmission element 21 designed as a clutch or the transmission element 22 designed as a clutch reaches its touch point when opening, the force ratios at the decoupling valve 45 are coordinated in such a way that the decoupling valve 45 switches over and the hydraulic functional surface 32 is acted upon for disengagement.

As shown symbolically or schematically in FIG. 4, this is done by means of pressure control surfaces of different sizes on the decoupling valve 45. Here, the pressure control surface for the opening valve position is larger than that for closing. The pressure level for switching the decoupling valve 45 is typically lower than the two touch pressures of the clutches 21, 22.

This in turn is important when torque is transferred from clutch 21 to clutch 22, since the decoupling unit should remain securely closed here. With such a design, the decoupling can take place only when one of the two clutches 21, 22 is already open and the second passes through the touch point when opening.

An optional spring on the decoupling valve 45, which reliably guarantees a position of the decoupling valve 45 in the depressurized state, is not shown. Depending on the boundary conditions, such as a suitable control strategy, the first or second valve position of the decoupling valve 45 can be advantageous.

FIG. 5 shows a detailed variant of the decoupling valve 45. Switching from one valve position to the other is proportional to the respective pressure signal size. The respective load pressures are fed back to the decoupling valve 45, which is designed as a proportional valve. A transitional position between the two end positions is designed in such a way that both pressure chambers of the double-acting cylinder 30 of the decoupling unit 27 are located on the tank. This has the advantage that there can never be pressure on both pressure chambers of the double-acting cylinder 30 at the same time.

Variants in which only one of the two pressure chambers of the double-acting cylinder 30 of the decoupling unit 27 is fed back to the decoupling valve 45 are not shown. It could be advantageous to dispense with the return when opening the decoupling unit 27 in order to make the decoupling more robust or more dynamic.

LIST OF REFERENCE SYMBOLS

1 Motor vehicle
2 Drive train
3 Driven axle
4 Driven axle
5 Wheel
6 Wheel
7 Wheel
8 Wheel
9 Axle drive
10 Axle drive
11 Drive
12 Transmission ratio device
13 Decoupling unit
14 Wheel
15 Hydraulic pressure source
16 Actuation force line
17 Branching point
18 Branching point
19 First actuating branch
20 Second actuating branch
21 First transmission element
22 Second transmission element
23 Pressure reducing valve
24 Branching point
25 Pressure reducing valve
26 Branching point
27 Decoupling unit
28 Cut-out clutch
29 OR valve
30 Double-acting cylinder
31 First hydraulic functional surface
32 Second hydraulic functional surface 33 OR valve
34 Tank line
35 Tank line
37 Actuating branch
38 Branching point
41 Hydraulic resistance
42 Hydraulic resistance
45 Decoupling valve
50 Other hydraulic pressure source

The invention claimed is:

1. A method for actuating a decoupling unit in a drive train which comprises at least one driven axle, the method comprising:
    actuating the decoupling unit with an actuation force present in a hydraulic system in an actuation direction via a first hydraulic functional surface, and
    actuating the decoupling unit with a restoring force in a restoring direction via a second hydraulic functional surface, the restoring force generated by two transmission elements, wherein a hydraulic resistance is arranged in a tank line of each of the two transmission elements to generate the restoring force, and the tank line is configured to be continuously connected to a tank.

2. The method according to claim 1, wherein a first hydraulic control surface for restoring the decoupling unit is larger than a second hydraulic control surface for actuating the decoupling unit.

3. The method according to claim 1, wherein the decoupling unit comprises a double-acting hydraulic cylinder configured to be actuated and reset via a decoupling valve.

4. The method according to claim 3, wherein the decoupling valve is configured as a 4/2-way valve which is controlled via two OR valves.

5. The method according to claim 4, wherein the decoupling valve is configured as a proportional valve.

6. The method according to claim 1, wherein the decoupling unit comprises a double-acting hydraulic cylinder having the first hydraulic functional surface and the second hydraulic functional surface.

7. A method for actuating a decoupling unit configured to deactivate a driven axle within a drive train of a vehicle, the method comprising:
    providing a hydraulic system including:
        a first actuating branch comprising a first clutch or brake,
        a second actuating branch comprising a second clutch or brake,
        a decoupling unit,
        a first OR valve,
        a second OR valve, and
    actuating the decoupling unit via the first OR valve with a hydraulic actuation force present within the hydraulic system configured to actuate the first clutch or brake or the second clutch or brake, and
    actuating the decoupling unit with a hydraulic restoring force via the second OR valve.

8. The method according to claim 7, wherein the decoupling unit is configured as a cut-out clutch.

9. The method according to claim 7, wherein the hydraulic system further comprises a first hydraulic branch configured to fluidly connect the first actuating branch to the second actuating branch, and the first hydraulic branch includes the first OR valve.

10. The method according to claim 7, wherein the first actuating branch further comprises a first pressure reducing valve corresponding to the first clutch or brake, and the second actuating branch further comprises a second pressure reducing valve corresponding to a second clutch or brake.

11. The method according to claim 10, wherein the hydraulic system further comprises a second hydraulic branch configured to fluidly connect the second OR valve to: i) a first tank line of the first pressure reducing valve, and ii) a second tank line of the second pressure reducing valve.

12. The method according to claim 11, wherein each one of the first tank line and the second tank line includes a hydraulic resistance configured as an orifice.

13. The method according to claim 10, wherein the hydraulic system further comprises a hydraulic pressure source configured to supply:
    the first clutch or brake,
    the second clutch or brake,
    the first pressure reducing valve, and
    the second pressure reducing valve.

14. The method according to claim 7, wherein the decoupling unit comprises a double-acting hydraulic cylinder.

15. The method according to claim 14, wherein the first OR valve is fluidly connected to a first functional surface of the double-acting hydraulic cylinder and the second OR valve is fluidly connected to a second functional surface of the double-acting hydraulic cylinder.

16. A method for actuating a decoupling unit in a drive train which comprises at least one driven axle, the method comprising:
    actuating the decoupling unit with an actuation force present in a hydraulic system in an actuation direction via a first hydraulic functional surface, and
    actuating the decoupling unit with a restoring force in a restoring direction via a second hydraulic functional surface, wherein the restoring force is provided via a tank line of a drive train element arranged within the hydraulic system, and the tank line is configured to be continuously connected to a tank.

17. The method according to claim 16, wherein a hydraulic resistance is arranged in the tank line.

18. The method according to claim 16, wherein the restoring force is provided via a first tank line of a first drive train element and a second tank line of a second drive train element.

* * * * *